United States Patent
Yi et al.

(10) Patent No.: US 11,172,344 B2
(45) Date of Patent: Nov. 9, 2021

(54) TERMINAL FOR PROVIDING DEVICE-TO-DEVICE WIRELESS COMMUNICATION AND METHOD OF CONTROLLING POWER THEREOF

(71) Applicant: Samsung Electronics Co., Ltd., Gyeonggi-do (KR)

(72) Inventors: Kyuhwan Yi, Seoul (KR); Jaieun Jung, Gyeonggi-do (KR); Chaeman Lim, Seoul (KR)

(73) Assignee: Samsung Electronics Co., Ltd

( * ) Notice: Subject to any disclaimer, the term of this patent is extended or adjusted under 35 U.S.C. 154(b) by 741 days.

(21) Appl. No.: 15/997,211

(22) Filed: Jun. 4, 2018

(65) Prior Publication Data

US 2018/0352404 A1    Dec. 6, 2018

(30) Foreign Application Priority Data

Jun. 2, 2017 (KR) .................... 10-2017-0068993

(51) Int. Cl.
*H04W 4/70* (2018.01)
*H04W 56/00* (2009.01)
(Continued)

(52) U.S. Cl.
CPC ............. *H04W 4/70* (2018.02); *H04W 48/16* (2013.01); *H04W 56/001* (2013.01);
(Continued)

(58) Field of Classification Search
CPC ..... H04W 76/14; H04W 88/04; H04W 76/28; H04W 8/005; H04W 64/003; H04W 76/11
See application file for complete search history.

(56) References Cited

U.S. PATENT DOCUMENTS 9,451,556 B2    9/2016  Yano et al.
2015/0245383 A1*  8/2015  Seo ................. H04L 5/0094
                                                      370/336
(Continued)

FOREIGN PATENT DOCUMENTS

JP    2017-005727    1/2017
KR   1020160096985   8/2016

OTHER PUBLICATIONS

Korean Office Action dated Sep. 21, 2020 issued in counterpart application No. 10-2017-0068993, 11 pages.

*Primary Examiner* — Charles C Jiang
*Assistant Examiner* — Voster Preval
(74) *Attorney, Agent, or Firm* — The Farrell Law Firm, P.C.

(57) ABSTRACT

A user equipment (UE) is provided. The UE supports D2D wireless communication and includes a communication module configured to communicate with at least one different UE, a non-transitory computer readable memory storage configured to store instructions, and at least one processor electrically connected to the communication module and the memory storage. The instructions, when executed by the UE, cause the processor to check whether an available first synchronization signal is detected, determine whether to operate as a first synchronization reference UE based on whether the first synchronization signal is detected, and transmit first system information comprising an intensity of transmission power and a second synchronization signal comprising a first synchronization identifier if the UE is determined to operate as the first synchronization reference UE.

16 Claims, 12 Drawing Sheets

(51) Int. Cl.
  *H04W 88/04*    (2009.01)
  *H04W 48/16*    (2009.01)
  *H04W 76/14*    (2018.01)
  *H04W 8/00*     (2009.01)
  *H04W 48/12*    (2009.01)

(52) U.S. Cl.
  CPC ............ *H04W 8/005* (2013.01); *H04W 48/12* (2013.01); *H04W 76/14* (2018.02); *H04W 88/04* (2013.01)

(56) References Cited

U.S. PATENT DOCUMENTS

| | | |
|---|---|---|
| 2016/0037385 A1 | 2/2016 | Boudreau et al. |
| 2016/0205534 A1 | 7/2016 | Fujishiro et al. |
| 2017/0142703 A1 | 5/2017 | Xue et al. |
| 2017/0289934 A1* | 10/2017 | Sheng ................. G01S 19/14 |
| 2018/0199388 A1* | 7/2018 | Tabet ............... H04W 72/0446 |
| 2018/0234928 A1* | 8/2018 | Yasukawa ............ H04W 56/00 |
| 2019/0053305 A1* | 2/2019 | Saiwai .............. H04W 72/0406 |
| 2019/0297590 A1* | 9/2019 | Yang ................. H04W 56/002 |

\* cited by examiner

TERMINAL FOR PROVIDING DEVICE-TO-DEVICE WIRELESS COMMUNICATION AND METHOD OF CONTROLLING POWER THEREOF

CROSS-REFERENCE TO RELATED APPLICATION

This application is based on and claims priority under 35 U.S.C. § 119 to Korean Patent Application Serial No. 10-2017-0068993, filed on Jun. 2, 2017 in the Korean Intellectual Property Office, the entire disclosure of which is incorporated herein by reference.

BACKGROUND

1. Field

The disclosure relates, generally, to an electronic device, and more particularly, to a terminal supporting device-to-device (D2D) wireless communication and a method of controlling power of the same.

2. Description of the Related Art

The $3^{rd}$ generation partnership project (3GPP) (a mobile communication standard organization) has completed a standardization task so that wireless communication between user equipments (UEs) or devices (e.g., D2D communication) in addition to the existing wireless communication between a base station and a UE, is supported in a long term evolution (LTE) system.

One of the major functions supported in D2D communication is communication for providing a public safety (PS) service. The PS service should be able to support LTE-based wireless communication of a public safety-related group, such as the police, firefighters or government personnel, although a network may not normally be provided in the event of a natural disaster and an emergency situation. In this case, a D2D communication-capable UE includes both a public safety UE (PS UE) and a non-public safety UE (NPS UE).

Generally, in order to smoothly perform communication in a wireless communication system, a timing reference is obtained, such as synchronization to be used for the signal transmission/reception of UEs within the system. If a network service operates in the LTE system, UEs within the service area of a base station may obtain synchronization by receiving a primary synchronization signal/secondary synchronization signal (PSS/SSS) transmitted by a base station in the downlink. In the case of D2D communication, the PS service is supported by providing other ways for obtaining synchronization, even in situations in which a UE cannot obtain synchronization by receiving a PSS/SSS from a base station because a network cannot provide service normally.

In D2D communication, a UE not belonging to the service area of a base station can be provided with synchronization acquisition using a D2D synchronization signal different from a PSS/SSS (e.g., the existing LTE cellular synchronization signal). The D2D synchronization signal includes two synchronization signals defined as a primary sidelink synchronization signal (PSSS) and a secondary sidelink synchronization signal (SSSS), respectively. The PSSS and SSSS include a Zadoff-Chu (ZC) sequence and an m-sequence, respectively, like the PSS and SSS transmitted by a base station in the LTE cellular system. A 6-resource block (RB) frequency resource in the middle of a subframe for synchronization transmission/reception, which is present in a cycle of 40 in terms of time, may be used as resources in which the PSSS/SSSS are transmitted. In a normal subframe, the PSSS is continuously transmitted in second and third SC-FDMA symbols, and the SSSS is continuously transmitted in twelfth and thirteenth SC-FDMA symbols. The PSSS/SSSS synchronization signal may be transmitted by a D2D UE, and may be used by a PS UE and/or an NPE UE.

A subframe in which the PSSS/SSSS may be transmitted is determined based on the configuration of a base station or a predetermined configuration. When the configuration of a base station is applied, a D2D UE in coverage transmits a PSSS/SSSS using a base station as a D2D synchronization reference and thus the D2D synchronization reference is provided to D2D UEs out of coverage. When the predetermined configuration is used, a D2D UE out of coverage may operate as a D2D synchronization reference because a D2D UE cannot receive a network service normally.

When a base station and a UE communicate with each other, the base station provides a reference signal power (referenceSignalPower) in the downlink. Accordingly, the UE may calculate a downlink path loss (PL) based on reference signal received power (RSRP). In D2D communication, a PL between UEs may not be calculated because the reference signal power is not provided from a synchronization reference UE.

SUMMARY

The present disclosure has been made to address at least the disadvantages described above and to provide at least the advantages described below.

An aspect of the present disclosure provides a method for calculating a PL between UEs supporting D2D wireless communication and controlling power by taking the PL into consideration and a UE using the method.

An aspect of the disclosure provides a UE. The UE supports D2D wireless communication and includes a communication module configured to communicate with at least one different UE, a non-transitory computer readable memory storage configured to store instructions, and at least one processor electrically connected to the communication module and the memory storage. The instructions, when executed by the UE, cause the processor to check whether an available first synchronization signal is detected, determine whether to operate as a first synchronization reference UE based on whether the first synchronization signal is detected, and transmit first system information comprising an intensity of transmission power and a second synchronization signal comprising a first synchronization identifier if the UE is determined to operate as the first synchronization reference UE.

Another aspect of the disclosure provides a UE. The UE supports D2D wireless communication and includes a communication module configured to communicate with at least one different UE, a non-transitory computer readable memory storage configured to store instructions, and at least one processor electrically connected to the communication module and the memory storage. The instructions, when executed by the UE, cause the processor to receive a first synchronization signal and first system information from a first synchronization reference UE, synchronize with the first synchronization reference UE based on the received first synchronization signal and determine whether to operate as a second synchronization reference UE based on an intensity of the first synchronization signal, determine the intensity of transmission power of at least one D2D wireless communication channel to be used by the second synchronization reference UE based on the received first system information, and transmit a second synchronization signal and second system information based on the determined intensity of transmission power.

Another aspect of the disclosure provides a method. The method controls power of a D2D wireless communication UE and includes checking, by the UE, whether an available first synchronization signal is detected, determining, by the UE, whether to operate as a first synchronization reference UE based on whether the first synchronization signal is detected, and transmitting, by the UE, first system information comprising an intensity of transmission power and a second synchronization signal comprising a first synchronization identifier if the UE is determined to operate as the first synchronization reference UE.

Another aspect of the disclosure provides a method. The method controls power of a D2D wireless communication UE and includes receiving a first synchronization signal and first system information from a first synchronization reference UE, synchronizing with the first synchronization reference UE based on the received first synchronization signal, determining whether to operate as a second synchronization reference UE based on an intensity of the first synchronization signal, determining the intensity of transmission power of at least one D2D wireless communication channel to be used by the second synchronization reference UE based on the received first system information, and transmitting a second synchronization signal and second system information based on the determined intensity of transmission power.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Figure 1:
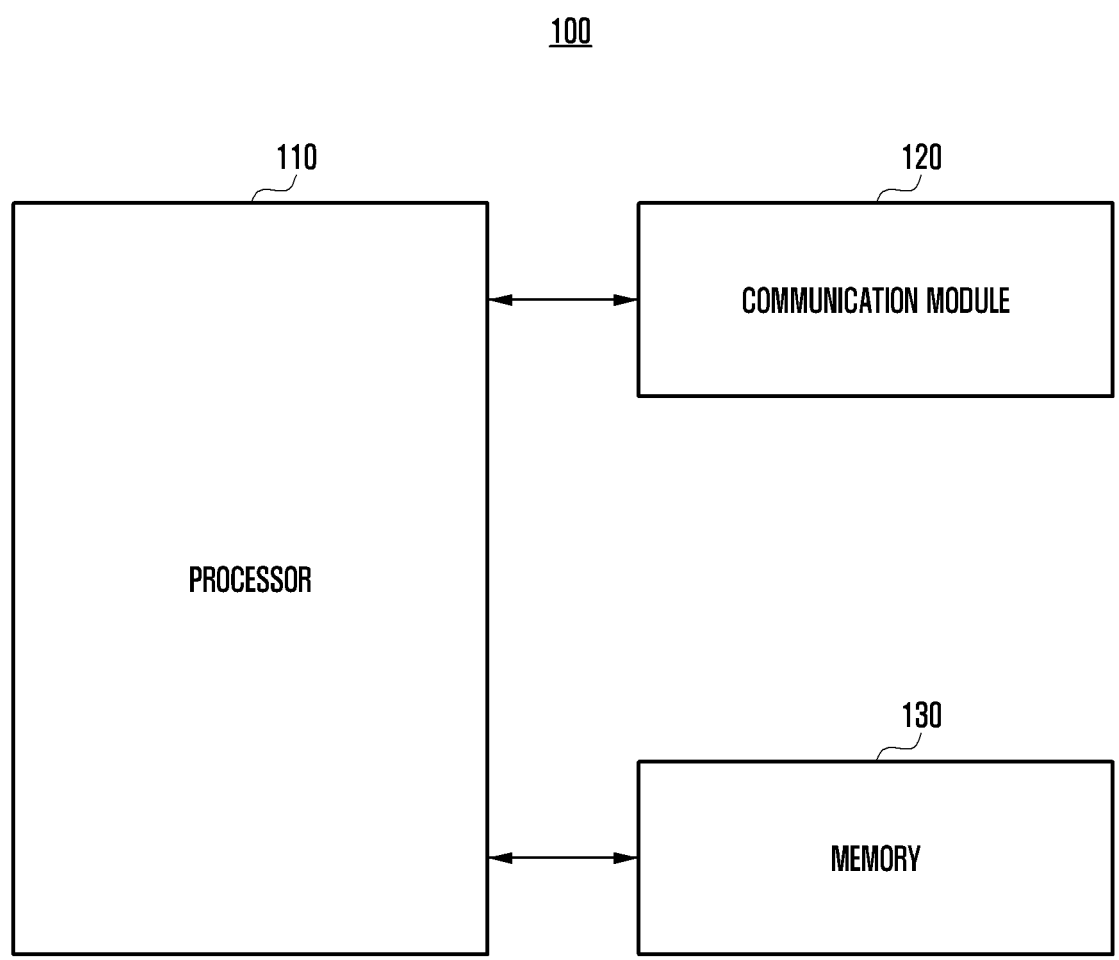
FIG. 1 is a diagram of a UE supporting D2D wireless communication according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an internet of things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" may indicate a person using an electronic device or a device (e.g., an artificial intelligence electronic device) using an electronic device.

Although embodiments of the present disclosure will be described below with reference to an OFDMA-based wireless communication system, i.e., the LTE standard, the present disclosure is not limited thereto and may be applied to other communication systems. UEs capable of D2D communication may perform discovery operations and pairing operations between them in a distributed manner.

Radio resources used for UEs to perform the discovery operation and pairing operation may be D2D communication-dedicated resources in the LTE mobile communication system and a predefined radio frequency band may be used as the radio resource.

In LTE, a frequency domain resource allocation unit is a physical resource block (PRB), includes 12 contiguous subcarrier of a 15 kHz interval, and has a size of 180 kHz. Further, a time domain resource allocation unit is a subframe having a length of 1 ms, and 10 subframe form a single radio frame. One radio frame corresponds to one system frame number (SFN). One subframe may include two slots ($0^{th}$ slot and $1^{st}$ slot), each one having a length of 0.5 ms. In a normal subframe, each slot includes 7 orthogonal frequency division multiplex (OFDM) symbols in the case of the downlink, and includes 7 single carrier-frequency division multiple access (SC-FDMA) symbols in the case of the uplink.

FIG. 1 is a diagram of a UE supporting D2D wireless communication according to an embodiment.

Referring to FIG. 1, the UE 100 supporting D2D wireless communication includes a processor 110, a communication module 120, and memory 130 (e.g., memory storage). The UE 100 supporting D2D wireless communication may omit at least one of the elements or may additionally include a different element.

The processor 110 may include a central processing unit, an application processor, and a communication processor (CP). The processor 110 may execute an operation or data processing regarding the control and/or communication of at least one different element of the UE 100 supporting D2D wireless communication.

The communication module 120 may include cellular communications using at least one of LTE, LTE advance (LTE-A), code division multiple access (CDMA), wideband CDMA (WCDMA), universal mobile telecommunications system (UMTS), wireless broadband (WiBro), and global system for mobile communications (GSM). The communication module 120 may include at least one of wireless fidelity (Wi-Fi), Bluetooth, Bluetooth low energy (BLE), Zigbee, near field communication (NFC), magnetic secure transmission, a radio frequency (RF), and a body area network (BAN).

The memory 130 may include volatile and/or nonvolatile memory. The memory 130 may store a command (or instructions) or data related to at least one different element of the UE 100 supporting D2D wireless communication. The memory 130 may store software and/or a program.

Figure 2:
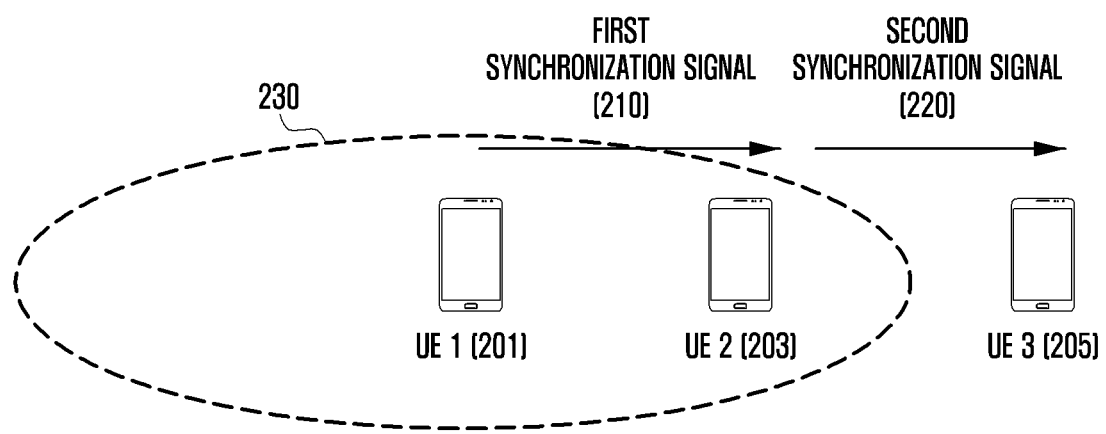
FIG. 2 is a diagram of an out-of-coverage D2D wireless communication environment according to an embodiment.

FIG. 2 is a diagram of an out-of-coverage D2D wireless communication environment according to an embodiment.

Referring to FIG. 2, "out of coverage" indicates that a base station is not present. A UE1 201 that is a D2D communication UE may not operate as a D2D synchronization reference because there is no target that may be adopted as a D2D synchronization reference nearby. A UE that behaves as a synchronization reference (hereinafter referred to as a "SyncRef UE" or "synchronization reference UE") may determine a synchronization resource based on a predetermined configuration and transmit synchronization information. A UE that receives a synchronization reference (hereinafter referred to as a "SyncRX UE") from the SyncRef UE may receive synchronization information from the SyncRef UE and may be synchronized with the SyncRef UE.

The UE1 201 may operate as a SyncRef UE, and may transmit a first synchronization signal 210 based on its own D2D synchronization source timing. A synchronization identifier (e.g., sidelink synchronization signal ID (SLSSID)) included in the first synchronization signal 210 may be selected by the UE1 201. The synchronization identifier may include a primary sidelink synchronization signal (PSSS) and a secondary sidelink synchronization signal (SSSS). The PSSS and SSSS may include a Zadoff-Chu (ZC) sequence and an m-sequence, respectively. 6-resource block (RB) frequency resources in the middle of a subframe for synchronization transmission/reception, which is present in a cycle of 40 in terms of time, may be used as resources in which the PSSS/SSSS is transmitted.

A UE2 203 within the service area 230 of the UE1 201 may be synchronized with the UE1 201 by detecting the PSSS/SSSS in the first synchronization signal 210 from the UE1 201. The UE1 201 may transmit system information through a D2D broadcast channel (e.g., physical sidelink broadcast channel (PSBCH)). The UE2 203 that has received the PSBCH may obtain the system information of the UE1 201 by decoding the PSBCH. Thus, the UE1 201 and the UE2 203 may perform the transmission/reception of a D2D data channel (e.g., physical sidelink shared channel (PSSCH)), D2D control channel (e.g., physical sidelink control channel (PSCCH), and D2D discovery channel (e.g., physical sidelink discovery channel (PSDCH)).

The UE2 203 may operate as a SyncRef UE as a wireless communication environment varies.

The UE2 203 may transmit a second synchronization signal 220 based on D2D synchronization source timing obtained from the UE1 201. In this case, a synchronization identifier included in the second synchronization signal 220 may be configured based on a synchronization identifier selected by the UE1 201. As the UE2 203 operates as a SyncRef UE, a UE3 205 that is another D2D communication UE, out of the service area 230 of the UE1 201, may receive the second synchronization signal 220 from the UE2 203, and may be synchronized with the UE1 201. Like the UE1 201 and the UE2 203, the UE2 203 and the UE1 201 may perform the transmission/reception of a PSSCH, PSCCH, and PSDCH.

Figure 3:
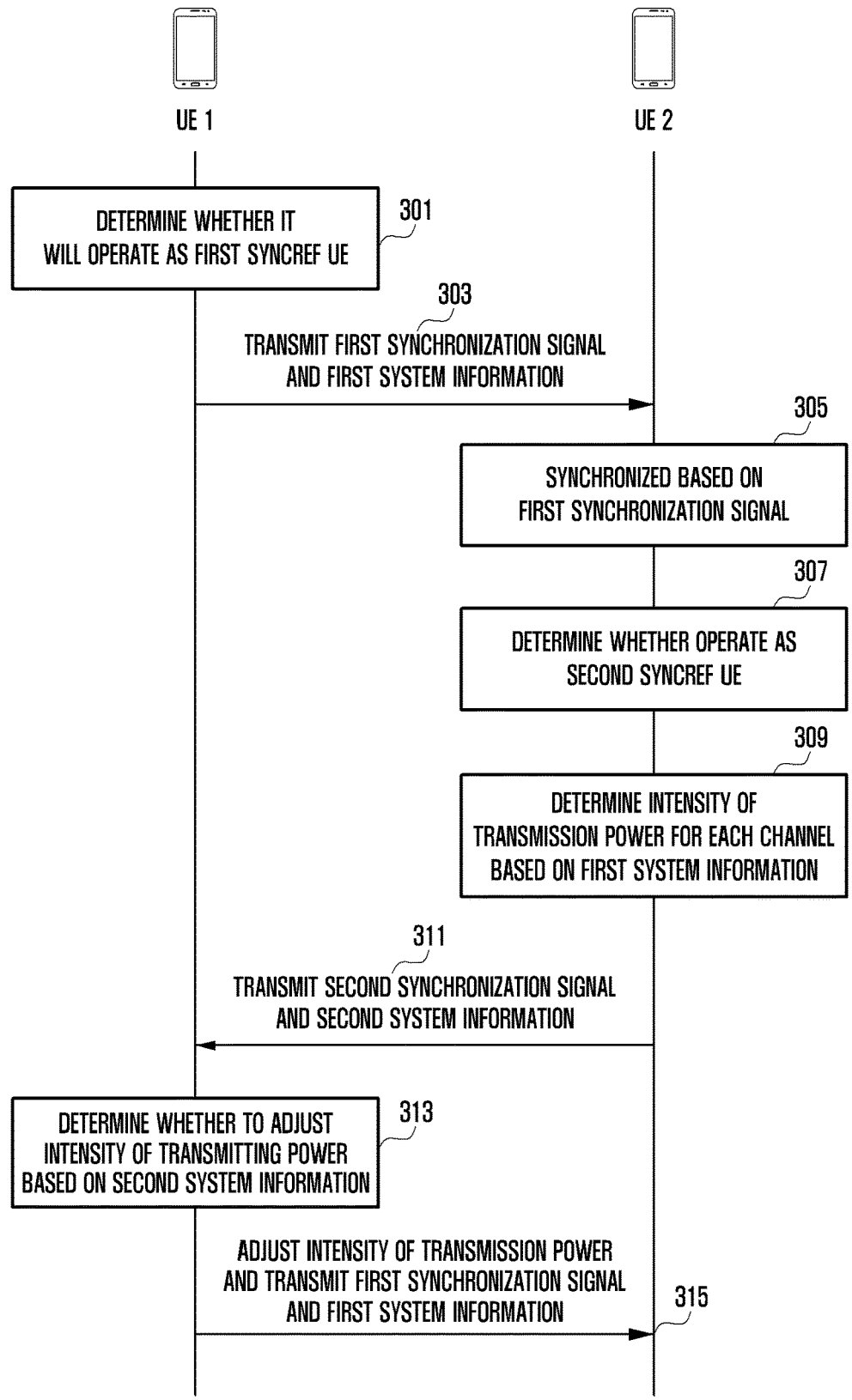
FIG. 3 is a flowchart of a D2D wireless communication synchronization method out of coverage according to an embodiment.

FIG. 3 is a flowchart of a D2D wireless communication synchronization method out of coverage according to an embodiment.

Referring to FIG. 3, at step 301, a first UE (UE1) determines whether it will operate as a first SyncRef UE. UE1 may identify whether a base station or another SyncRef UE is discovered nearby. If a base station or another SyncRef UE is not present nearby, UE1 may operate as a first SyncRef UE. UE1 is depicted as discovering another SyncRef UE, but UE1 may determine that the intensity of a synchronization signal received from another SyncRef UE is smaller than a predetermined minimum required value and may operate as a first SyncRef UE.

At step 303, the UE1 operates as a first SyncRef UE and transmit a first synchronization signal and first system information. The first synchronization signal may include a PSSS and an SSSS. The first system information may be transmitted through a channel for transmitting essential information used for communication between UEs, such as a PSBCH. The first system information may include a D2D master information block "MasterinformationBlock-SL" (MIB-SL). The first system information may include the intensity of transmission power for at least one channel.

At step 305, a second UE (UE2) receives the first synchronization signal and first system information from UE1, and may be synchronized or synchronize with UE1 based on the first synchronization signal. UE2 may be synchronized or synchronize with UE2 by detecting the PSSS/SSSS from the first synchronization signal.

At step 307, UE2 determines whether to operate as a second SyncRef UE. If UE2 is located at the edge of coverage of UE1, the reference signal received power (RSRP) of the synchronization signal transmitted by UE1 may become a predetermined threshold, and thus UE2 may operate as a second SyncRef UE based on a threshold condition.

At step 309, UE2 determines the intensity of transmission power for each channel based on the first system information received from UE1. UE2 may operate as a second SyncRef UE, and the intensity of transmission power of at least one channel of a PSSS, an SSSS, a PSSCH, a PSCSH, and a PSDCH may be determined based on the first system information received from UE1.

At step 311, UE2 transmits a second synchronization signal and second system information based on the determined intensity of transmission power for each channel. The second synchronization signal may include the same PSSS and SSSS as those of the first synchronization signal received from UE1. Furthermore, the second system information may be transmitted through a PSBCH. The second system information may include the intensity of transmission power that belongs to the pieces of determined transmission power for the channels and that is related to the at least one channel.

At step 313, UE1 receives the second synchronization signal and second system information from UE2, and determines whether to adjust the intensity of transmitting power based on the second system information. UE1 may determine whether to adjust the intensity of transmission power of at least one channel of a PSSS, an SSSS, a PSSCH, a PSCSH, and a PSDCH based on the second system information received from UE2.

At step 315, UE1 adjusts the intensity of transmission power based on a result of the determination, and transmits a first synchronization signal and first system information.

FIG. 3 depicts UE1 and UE2 performing 1:1 D2D wireless communication. A detailed operation of each UE is described below by taking into consideration various D2D wireless communication environments.

Figure 4:
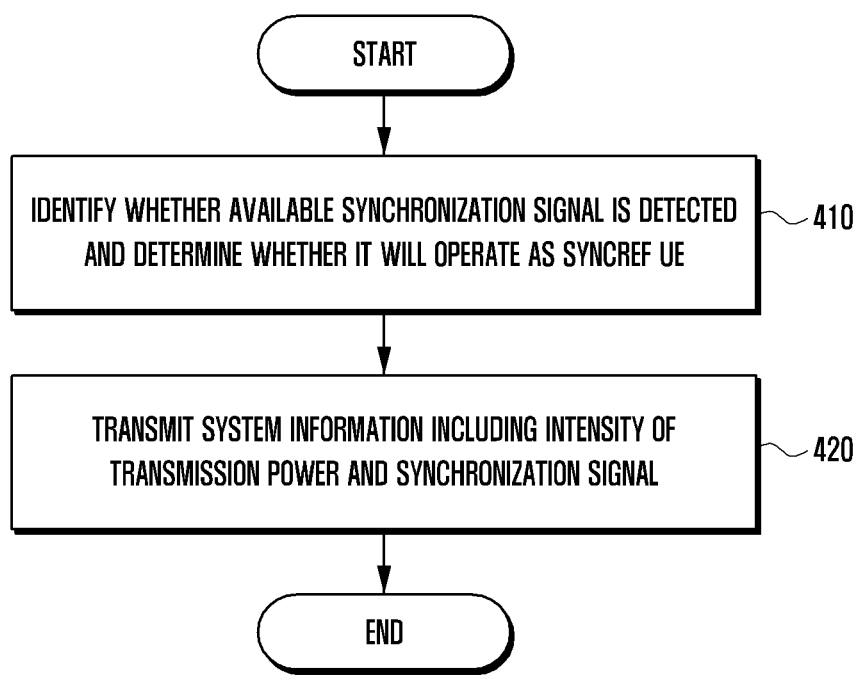
FIG. 4 is a flowchart of a method for a UE out of coverage to become a SyncRef UE according to an embodiment.

FIG. 4 is a flowchart of a method for a UE out of coverage to become a SyncRef UE according to an embodiment.

Referring to FIG. 4, at step 410, a UE supporting D2D wireless communication identifies whether an available synchronization signal is detected, and determines whether it will operate as a SyncRef UE. When the UE is initially powered on, the UE may discover whether an available public land mobile network (PLMN) is present. If it is determined that no camping cell is discovered, the UE may perform the discovery of a SyncRef UE in order to discover another adjacent D2D communication-capable UE. If a base station or any SyncRef UE is not discovered despite the execution of such processes, the UE may operate as a SyncRef UE.

A UE is depicted as discovering an adjacent SyncRef UE, but the UE may determine that the RSRP of a synchronization signal received from the adjacent SyncRef UE is smaller than a predetermined minimum required value, and the UE may operate as a SyncRef UE. If the RSRP of the synchronization signal received from the SyncRef UE is smaller than "minimum requirement+syncRefMinHyst", the UE may operate as a SyncRef UE. The minimum requirement or syncRefMinHyst may be defined based on a proximity based services (ProSe) parameter (e.g., ProsePreconfiguration) previously configured to perform a ProSe operation. The minimum requirement may include a minimum signal intensity value for a ProSe operation. syncRefMinHyst may include hysteresis used to evaluate a SyncRef UE through an absolute comparison. The minimum requirement and syncRefMinHyst may be defined as a dB value. When a minimum requirement is about −4 dB and syncRefMinHyst is about 0 dB, a UE may operate as a SyncRef UE if it is determined that the RSRP of a synchronization signal received from a SyncRef UE is about −4 dB or less.

At step 420, the UE operates as a SyncRef UE, and transmits (or broadcasts) system information including intensity of transmission power and a synchronization signal. The UE becoming a SyncRef UE may randomly select at least one of values (e.g., 168~335) within a given range as a synchronization identifier, and may periodically transmit the system information and the synchronization signal.

If a synchronization identifier is configured in a first range (e.g., 0~167), it may mean that a UE is in coverage. If the synchronization identifier is configured in a second range (e.g., 168~335), it may mean that the UE is out of coverage. Accordingly, a SyncRef UE out of coverage may randomly select at least one value of the second range as a synchronization identifier. A subframe in which the system information and synchronization signal are transmitted/received may be periodically transmitted in a cycle not smaller than about 40 ms.

The system information including intensity of transmission power may be included in a D2D master information block MIB-SL transmitted through a PSBCH. Table 1 is an example showing system information including MIB-SL.

TABLE 1

```
-- ASN1START
MasterInformationBlock-SL ::=    SEQUENCE {
    sl-Bandwidth-r12                 ENUMERATED {
                                         n6, n15, n25, n50,
                                         n75, n100},
    tdd-ConfigSL-r12                 TDD-ConfigSL-r12,
    directFrameNumber-r12            BIT STRING (SIZE (10)),
    directSubframeNumber-r12         INTEGER (0..9),
    inCoverage-r12                   BOOLEAN,
    reserved-r12                     BIT STRING (SIZE (19))
}
-- ASN1STOP
```

In Table 1, "sl-Bandwidth" indicates a parameter regarding a transmission band configuration, n6 may refer to 6 resource blocks, and n15 may refer to 15 resource blocks. "directFrameNumber" may indicate a frame number, and "inCoverage" may indicate whether a UE transmitting MIB-SL information is in coverage or out of coverage.

Generally, "reserved-r12" indicates nothing information. The "reserved-r12" may include the intensity of transmission power of at least one channel. A UE transmitting the MIB-SL information may include the intensity of transmission power of at least one channel of a PSSS, an SSSS, a PSSCH, a PSCSH, and a PSDCH in the "reserved-r12." Accordingly, another UE that has received the MIB-SL may decode MIB-SL, and may check the intensity of transmission power of the at least one channel used by the UE that has transmitted the MIB-SL information.

Figure 5:
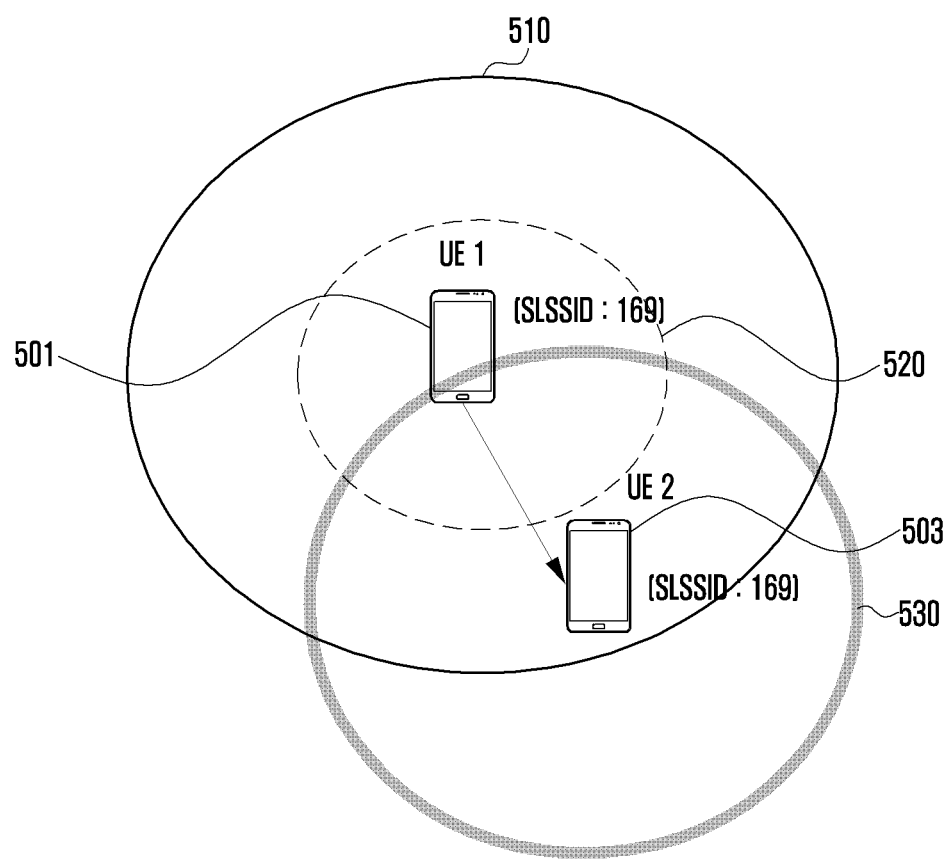
FIG. 5 is a diagram of a SyncRX UE out of coverage operating as a SyncRef UE according to an embodiment.

FIG. 5 is a diagram of a SyncRX UE out of coverage operating as a SyncRef UE according to an embodiment.

Referring to FIG. 5, UE1 501 is a SyncRef UE, and UE2 503 is a SyncRX UE that performs D2D wireless communication with UE1 501 based on a synchronization signal received from UE1 501.

Quality of such D2D wireless communication between UE1 501 and UE2 503 may be changed due to a change in the mobile or wireless communication environment of the UEs. When UE2 503 moves and is located at the boundary of the service area 510 of UE1 501, UE2 503 may determine that the intensity of a signal received from UE1 501 is smaller than a predetermined threshold (SyncTxThreshOoc) 520, and may operate as a SyncRef UE. The predetermined threshold may be defined based on a ProSe parameter (e.g., ProsePreconfiguration) previously configured to perform a ProSe operation.

UE2 503 may determine the intensity of transmission power for each channel to be used by a SyncRef UE based on system information received from UE1 501. UE2 503 may form a proper service area 530 by taking into consideration a wireless communication environment with UE1 501. UE2 503 may calculate a PL based on the RSRP of the system information received from UE1 501, and may determine the intensity of transmission power for each channel by taking into consideration the distance from UE1 501 or the intensity of transmission power of UE1 501.

Figure 6:
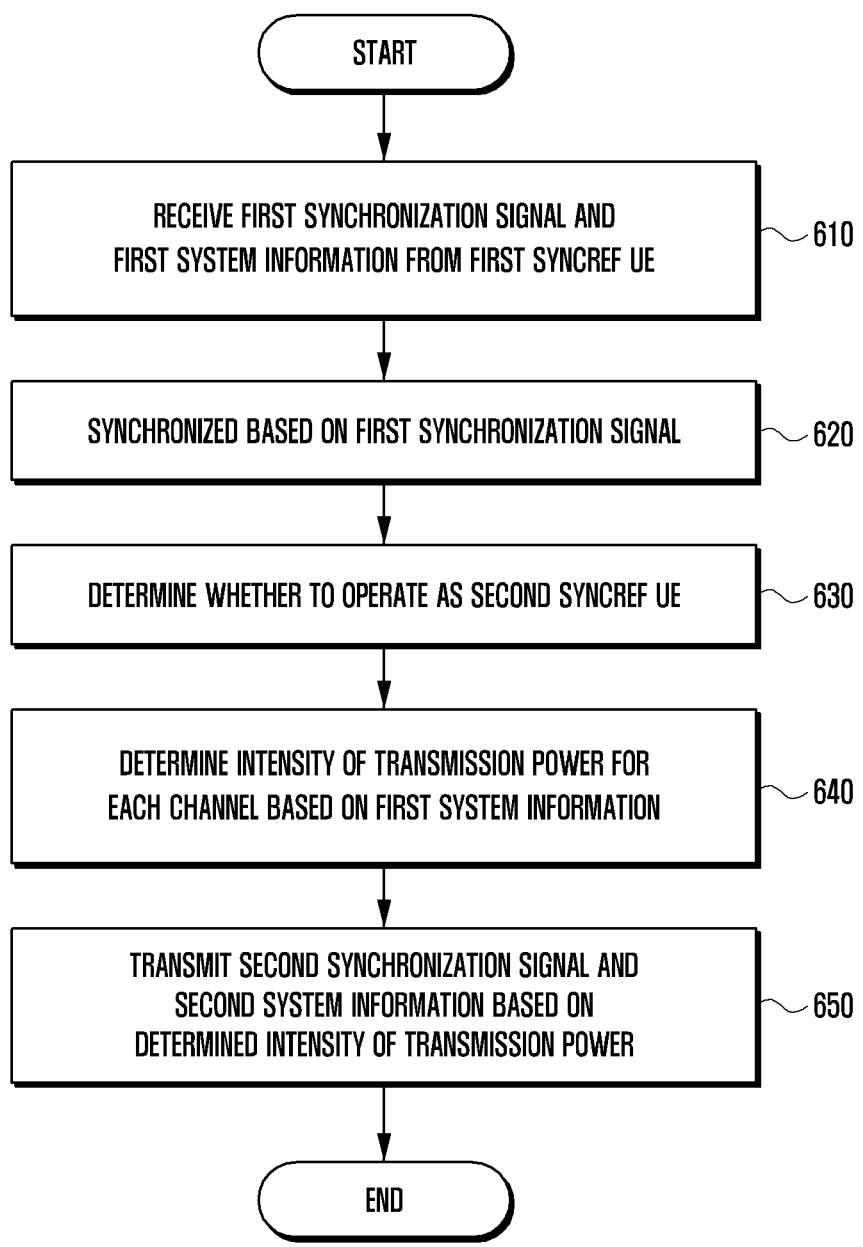
FIG. 6 is a flowchart of a method for a SyncRX UE out of coverage to operate as a SyncRef according to an embodiment.

FIG. 6 is a flowchart of a method for a SyncRX UE out of coverage to operate as a SyncRef according to an embodiment.

Referring to FIG. 6, at step 610, a UE receives a first synchronization signal and first system information from a first SyncRef UE.

At step 620, the UE synchronizes with the first SyncRef UE based on the first synchronization signal received from the first SyncRef UE. The UE may detect a PSSS/SSSS from the first synchronization signal received from the first SyncRef UE, and may be synchronized with the first SyncRef UE.

At step 630, the UE determines whether to operate as a second SyncRef UE based on the intensity of the first synchronization signal. Whether to operate as a second SyncRef UE may be determined based on a change in the wireless communication environment. A SyncRX UE may measure the RSRP of a synchronization signal received from a first SyncRef UE, may determine that the measured RSRP is smaller than a predetermined threshold (e.g., SyncTxThreshOoc), and may determine whether to operate as a SyncRef UE based on a threshold condition.

At step 640, the UE that has determined to operate as a second SyncRef UE at step 630 determines the intensity of transmission power of at least one D2D wireless communication channel to be used by the second SyncRef UE based on the first system information received from the first SyncRef UE. The first system information may include the intensity of transmission power of at least one channel used by the first SyncRef UE. The system information may be included in an MIB-SL transmitted through a PSBCH. A SyncRX UE may decode an MIB-SL, and may check the intensity of transmission power of at least one channel used by a first SyncRef UE through "reserved-r12." The SyncRX UE may check the RSRP based on a first synchronization signal received from the first SyncRef UE. Thus, the UE that has checked the intensity of transmission power of the at least one channel used by the first SyncRef UE and the RSRP of the at least one channel may check a path loss (PL) for the at least one channel.

In order to check the PL for the at least one channel, a downlink PL calculation method for a serving cell c may be used. The downlink path loss PLc for the serving cell c may be determined using Equation (1).

$$PLc = \text{referenceSignalPower} - \text{higher layer filtered RSRP} \quad (1)$$

The intensity of transmission power of the at least one channel used by the first SyncRef UE may be used as "referenceSignalPower." "referenceSignalPower" may be calculated as a dBm unit of an energy per resource element (EPRE) value. Furthermore, the RSRP of the at least one channel may be used as "higher layer filtered RSRP."

A PL between the first SyncRef UE and the SyncRX UE may be inferred by calculating the PL for the at least one channel.

The intensity of transmission power P for each channel may be determined using Equation (2).

$$P_{PSSS} = \min\{P_{CMAX, PSBCH}, 10\log_{10}(M_{PSSS}) + P_{O\_PSSS} + \alpha_{PSSS} \cdot PL\}$$

$$P_{SSSS} = \min\{P_{CMAX, SSSS}, 10\log_{10}(M_{SSSS}) + P_{O\_SSS} + \alpha_{SSSS} \cdot PL\}$$

$$P_{PSBCH} = \min\{P_{CMAX, PSBCH}, 10\log_{10}(M_{PSBCH}) + P_{O\_PSBCH,2} + \alpha_{PSBCH,2} \cdot PL\}$$

$$P_{PSCCH} = \min\{P_{CMAX, PSCCH}, 10\log_{10}(M_{PSCCH}) + P_{O\_PSCCH,2} + \alpha_{PSCCH,2} \cdot PL\}$$

$$P_{PSDCH} = \min\{P_{CMAX, PSDCH}, 10\log_{10}(M_{PSDCH}) + P_{O\_PSDCH,1} + \alpha_{PSDCH,1} \cdot PL\} \quad (2)$$

In Equation (2), $P_{CMAX}$ refers to maximum transmission power of a UE. $M_{PSSS}$, $M_{SSSS}$, $M_{PSBCH}$, $M_{PSCCH}$ and $M_{PSDCH}$ refer to the number of resource blocks allocated for each channel, and predetermined values there may be used based on the specifications and/or communication environment of a UE. For example, $M_{PSCCH}=1$, $M_{PSDCH}=2$, $M_{PSSS}=6$, etc. may be previously determined.

$P_{O\_PSSS}$, $\alpha_{PSSS}$, $P_{O\_SSSS}$, $\alpha_{SSSS}$, $P_{O\_PSBCH}$, $\alpha_{PSBCH,2}$, $P_{O\_PSCCH,2}$, $\alpha_{PSCCH,2}$, $P_{O\_PSDCH,1}$, and $\alpha_{PSDCH,1}$ are parameters for determining the intensity of transmission power, and may be defined based on a proximity based services (ProSe) parameter (e.g., ProsePreconfiguration) previously configured to perform a ProSe operation.

A PL between D2D communication UEs can be calculated. When a PL cannot be calculated, D2D wireless communication may have been performed by fixing the value α of each channel to 0 or using maximum transmission power. However, the current consumption may increase or interference with another UE may occur.

The intensity of transmission power can be properly adjusted because a PL between D2D communication UEs can be calculated. A UE may calculate a PL based on the RSRP of a signal received from adjacent UEs, and may adaptively adjust the intensity of transmission power by taking into consideration the distance from the adjacent UEs and/or the intensity of transmission power of the adjacent UEs.

At step 650, the UE that has determined the intensity of transmission power of at least one D2D wireless communication channel to be used as a second SyncRef UE at step 640 operates as a second SyncRef UE, and transmits a second synchronization signal and second system information based on the determined intensity of transmission power of the at least one D2D wireless communication channel. The second synchronization signal may be the same as the synchronization signal of the first SyncRef UE and the second SyncRef UE may transmit the second synchronization signal in the same cycle as the first SyncRef UE. Furthermore, the second system information may include the determined intensity of transmission power of the at least one channel.

Figure 7:
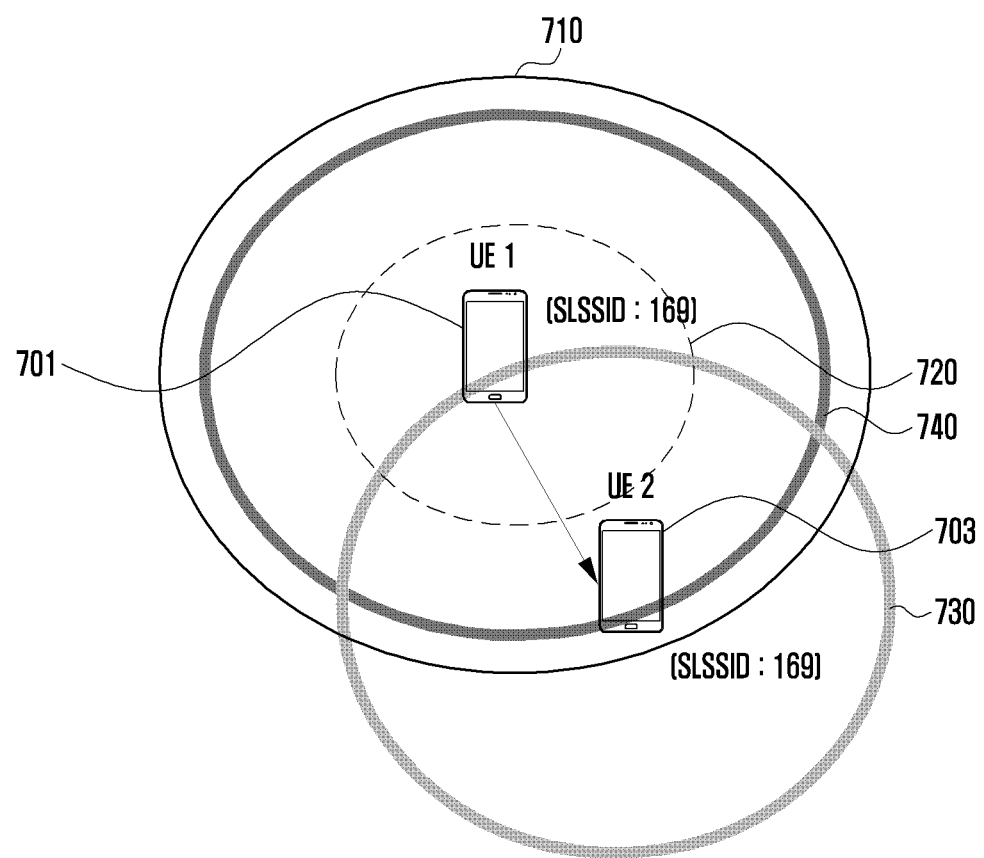
FIG. 7 is a diagram of a SyncRef UE out of coverage discovering another SyncRef UE having the same synchronization identifier according to an embodiment.

FIG. 7 is a diagram of a SyncRef UE out of coverage discovering another SyncRef UE having the same synchronization identifier according to an embodiment.

Referring to FIG. 7, UE1 701 is a first SyncRef UE, and UE2 703 is a second SyncRef UE having the same synchronization identifier (e.g., SLSSID: 169) as the first SyncRef UE.

UE1 701 operating as a SyncRef UE may periodically identify whether another SyncRef UE is detected nearby (e.g., a service area 710). When another SyncRef UE out of the service area 710 of UE1 701 enters the service area 710 of UE1 701 or a UE in the service area 710 of UE1 701 operates as a SyncRef UE, UE1 701 may detect another SyncRef UE.

UE1 701 and UE2 703 operating as a SyncRx UE within the service area 710 of UE1 701 may be located at a long distance at any moment because they have mobile characteristics. UE2 703 may be located at the boundary of the service area 710 of UE1 701. The boundary of the service area may be an area where a specific signal may be received from a SyncRef UE, but data communication is inappropriate because the intensity of the signal is very weak. UE2 703 may identify whether it is located at the boundary of the service area 710 of UE1 701 by comparing the RSRP of a signal received from UE1 701 with a predetermined threshold (SyncTxThreshOoc) 720. If UE2 703 is identified to be located at the boundary of the service area 710 of UE1 701, UE2 703 may switch to a SyncRef UE. Thus, UE2 703 may determine the intensity of transmission power to determine the service area 730 of UE2 703 based on a signal (e.g., system information or a synchronization signal) including the intensity of transmission power received from UE1 701 and a PL. In this case, UE2 703 may receive the signal from UE1 701, and at the same time may transmit a synchronization signal, including the intensity of transmission power, as a SyncRef UE. UE2 703 that has switched to a SyncRef UE transmits the synchronization signal in the same cycle as UE1 701. UE1 701 may identify that another SyncRef UE is present nearby based on the synchronization signal transmitted by UE2 703.

UE1 701 may identify the synchronization identifier of UE2 703 based on the system information received along with the synchronization signal. If UE2 703 is identified to have the same synchronization identifier (SLSSID: 169), a synchronization process is omitted, and UE2 703 may determine whether to adjust the intensity of transmission power for each channel. UE1 701 may adjust the intensity of transmission power of at least one channel of a PSSS, an SSSS, a PSSCH, a PSCSH, and a PSDCH based on second system information received from UE2 703. The intensity of transmission power of a channel may be determined using the same method as that described with reference to FIG. 6. UE1 701 may check the intensity of transmission power of at least one channel used by UE2 703 based on system information received from UE2 703, and may calculate a PL by checking the RSRP of the channel whose intensity of transmission power has been checked. Thereafter, UE1 701 may determine a proper intensity of transmission power for each channel for communication with UE2 703 based on the calculated PL. UE1 701 may change its own service area 710 into a new service area 740 based on the calculated PL. UE1 701 may use only power necessary for communication with UE2 703 by constructing the new service area 740. UE1 701 may control based on the intensity of transmission power based on a signal received from UE2 703. UE1 701 can consume power more efficiently compared to a case where a service area is constructed using a fixed intensity of transmission power. UE2 703 operating as a SyncRef UE at a different location may operate similarly even when it approaches the UE1 701.

Figure 8:
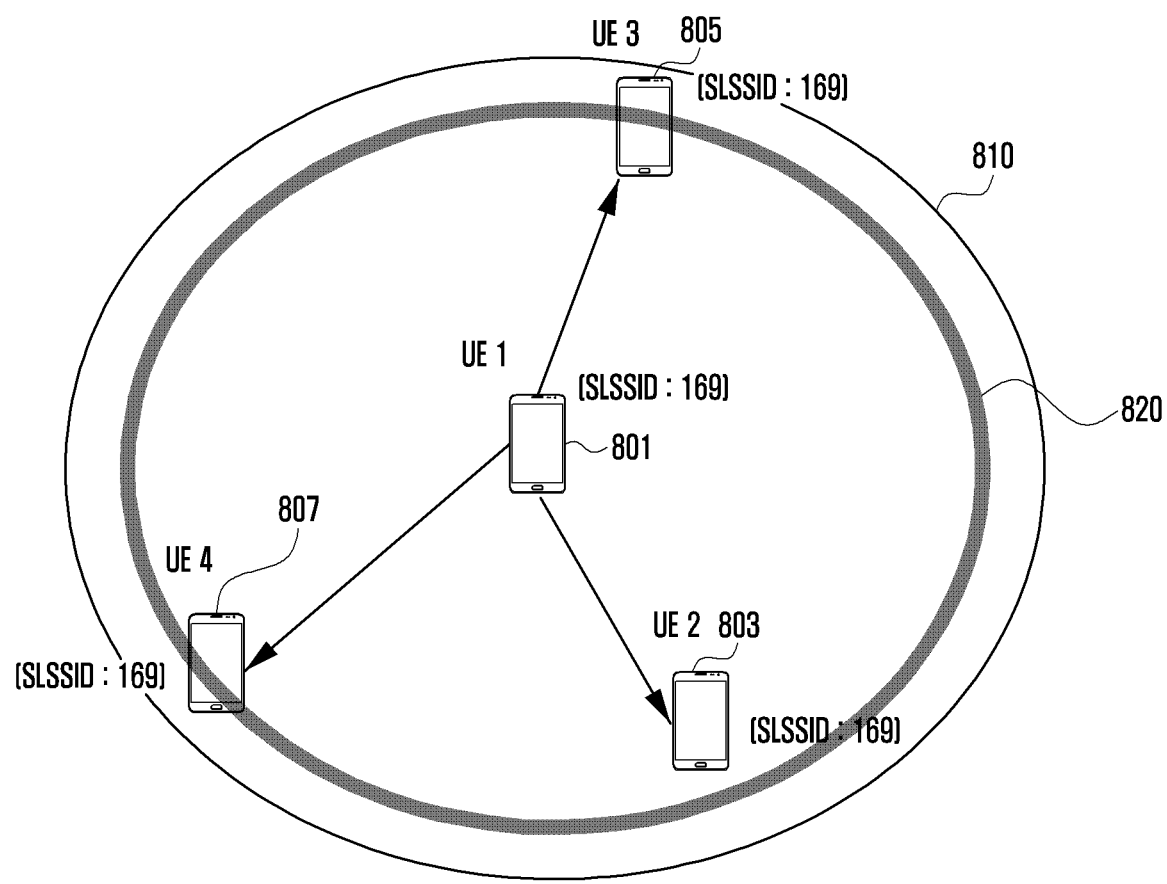
FIG. 8 is a diagram of a SyncRef UE out of coverage discovering a plurality of different SyncRef UEs having the same synchronization identifier according to an embodiment.

FIG. 8 is a diagram of a SyncRef UE out of coverage discovering a plurality of different SyncRef UEs having the same synchronization identifier according to an embodiment.

Referring to FIG. 8, UE1 801 is a first SyncRef UE. UE2 803, UE3 805 and UE4 807 are other SyncRef UEs having the same synchronization identifier (SLSSID: 169) as the first SyncRef UE.

UE1 801 operating as the first SyncRef UE may periodically identify whether another SyncRef UE is detected nearby. UE1 801 may identify that other SyncRef UEs having the same synchronization identifier (SLSSID: 169) of 2 or more are present nearby, and may calculate a PL for each of the SyncRef UEs using the aforementioned method. Thereafter, UE1 801 may determine the intensity of minimum transmission power based on a SyncRef UE having the greatest PL. For example, if the PL of UE3 805 is the greatest, UE1 801 may determine the intensity of minimum transmission power based on UE3 805. That is, the existing service area 810 of UE1 801 operates as a new service area 820 based on UE3 805. The new service area 820 may include UE2 803 and UE4 807 while using smaller transmission power than the existing service area 810.

Figure 9:
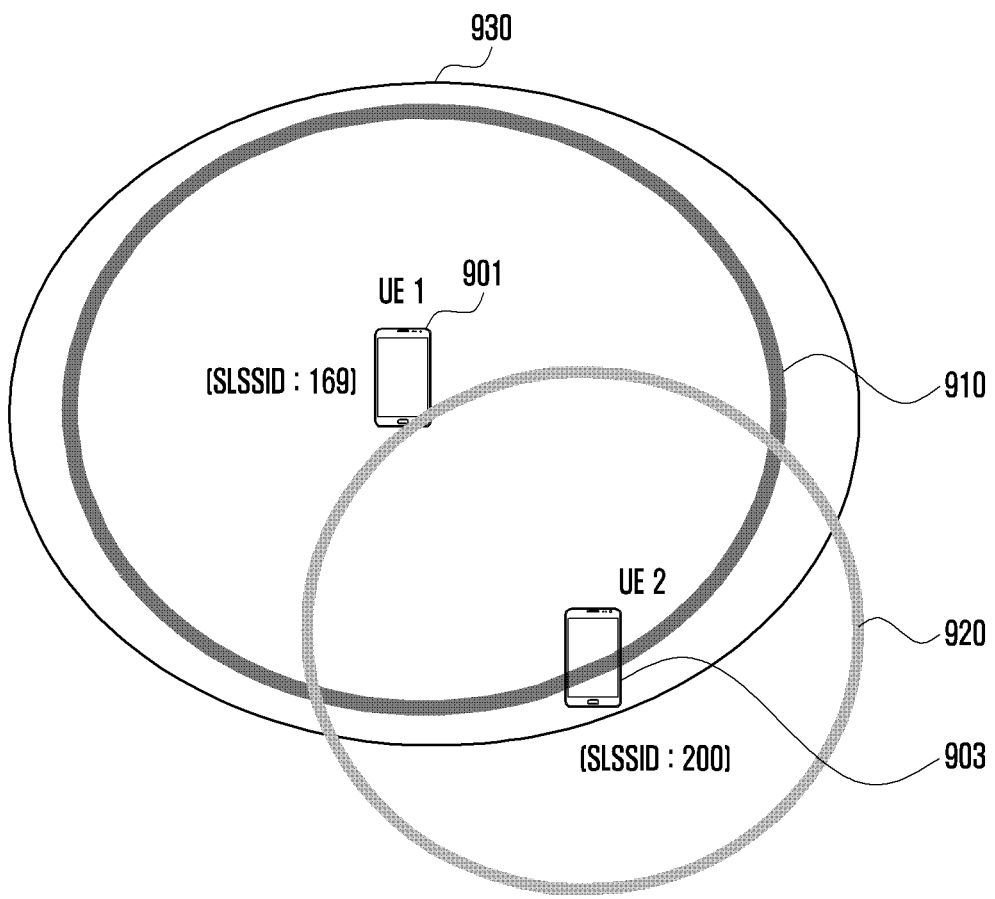
FIG. 9 is a diagram of a SyncRef UE out of coverage discovering another SyncRef UE having a different synchronization identifier according to an embodiment.

FIG. 9 is a diagram of a SyncRef UE out of coverage discovering another SyncRef UE having a different synchronization identifier according to an embodiment.

Referring to FIG. 9, UE1 901 is a first SyncRef UE having a first synchronization identifier (e.g., SLSSID: 169), and UE2 903 is a second SyncRef UE having a second synchronization identifier (e.g., SLSSID: 200) different from the synchronization identifier of the first SyncRef UE.

UE1 901 may identify that a SyncRef UE is present nearby based on a synchronization signal transmitted by UE2 903. UE1 901 may identify that UE2 903 is a SyncRef UE having a synchronization identifier different from the synchronization identifier of UE1 based on system information received along with the synchronization signal. Accordingly, UE1 901 may transmit a synchronization signal with maximum transmission power in order to be rapidly synchronized with UE2 903. The existing service area 910 of UE1 901 may change to a maximum service area 930. Likewise, UE2 903 discovers UE1 901, and may change the existing service area 920 to a maximum service area (not shown) in order to be synchronized with UE1 901.

When each of UE1 901 and UE2 903 transmits a synchronization signal with maximum transmission power through such a process, each of UE1 901 and UE2 903 may determine whether a counterpart UE is located in coverage and/or which UE has a high signal intensity, and they may be synchronized with each other based on predetermined priority. UE2 903 may determine that UE1 901 has higher priority than UE2 903, and may switch to a SyncRx UE of UE1 901. UE2 903 that is switched to a SyncRx UE may identify whether it is located at the boundary of the service area of UE1 901 and may determine that it is located at the boundary of the service area, UE2 903 may operate as a SyncRef UE having the same synchronization identifier (e.g., SLSSID: 169) as UE1 901.

Figure 10:
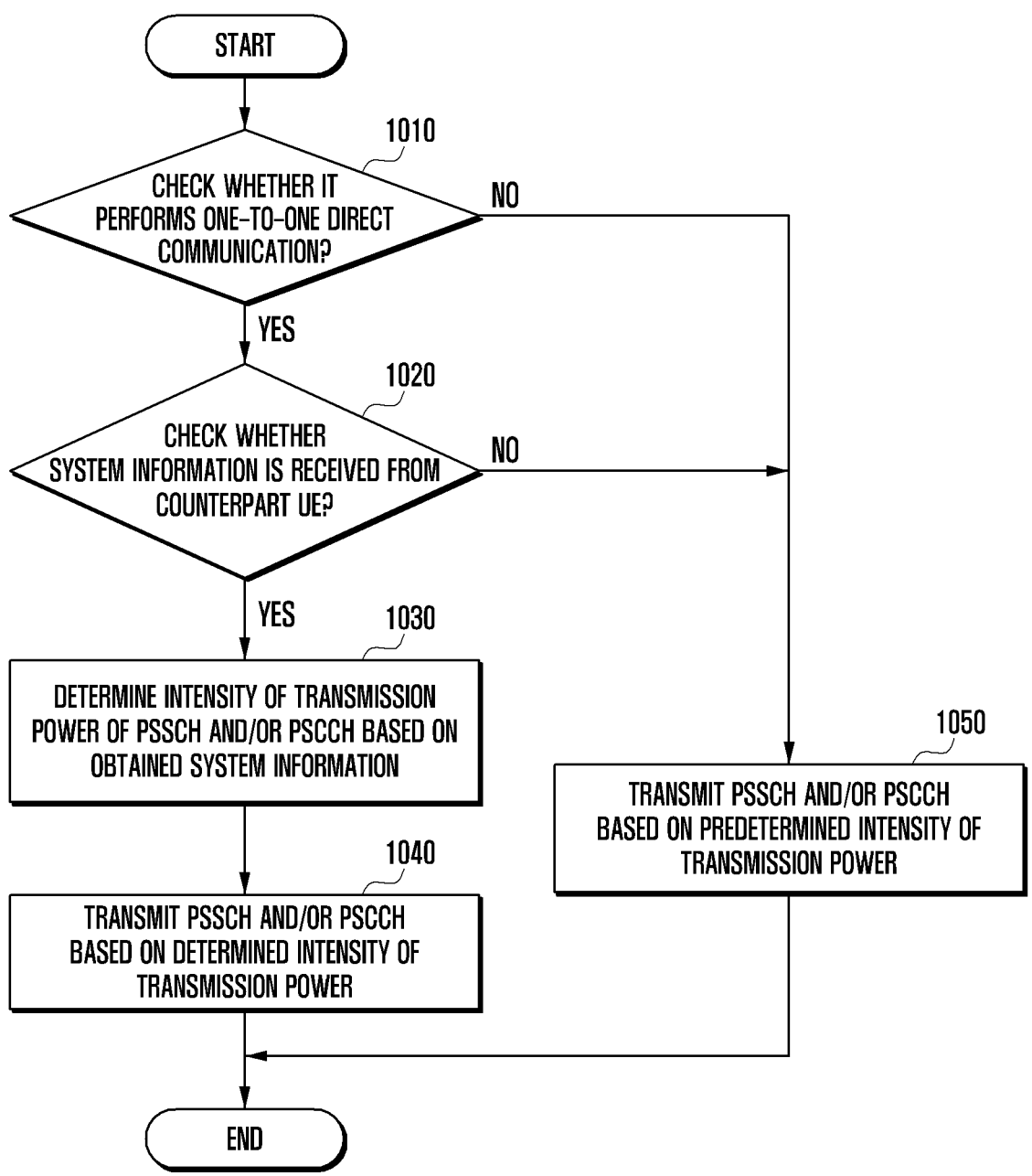
FIG. 10 is a flowchart of a method for a SyncRef UE out of coverage to control transmission power of a D2D wireless communication channel according to an embodiment.

FIG. 10 is a flowchart of a method for a SyncRef UE out of coverage to control transmission power of a D2D wireless communication channel according to an embodiment.

A SyncRx UE does not transmit a PSSS, an SSSS or a PSBCH like a SyncRef UE, but may transmit a PSSCH, a PSCCH and a PSDCH after synchronization. The SyncRx UE may control transmission power of a PSSCH, a PSCCH or a PSDCH.

For data communication between D2D UEs, grouping setting may be necessary separately from synchronization. It may be assumed that a UE2, a UE3, a UE4, and a UE5 synchronized with a UE1 (SyncRef UE) are present, UE2, UE3, and UE4 belong to a group 1, and UE5 belongs to a group 2. If UE1 is set as the group 1, UE1 may perform data communication with UE2, UE3, and UE4 belonging to the group 1, but may not perform data communication with UE5 belonging to the group 2. Likewise, if UE1 is set as the group 2, UE1 may perform data communication with UE5, but may not perform data communication with UE2, UE3, and UE4. Furthermore, in this case, the group 2 may be formed of SyncRx UEs only.

Referring to FIG. 10, at step 1010, a UE checks whether it now performs one-to-one direct communication with a counterpart UE.

The UE that performs one-to-one direct communication may use a given protocol (e.g., PC5 protocol). Accordingly, the UE may identify a protocol being used for communication with the counterpart UE, and may check whether it now performs one-to-one direct communication.

If the UE does not perform one-to-one direct communication at step 1010, at step 1020, the UE determines that it now performs one-to-many D2D wireless communication (e.g., group communication) with the counterpart UE, and checks whether it may obtain system information from the counterpart UE.

If the counterpart UE is a SyncRef UE, the UE may determine that it can obtain system information because the counterpart UE can transmit the system information along with a synchronization signal. In this case, if the counterpart UE is another SyncRX UE, the UE cannot obtain system information because the SyncRX UE does not transmit the system information.

If it is determined that the UE can obtain the system information from the counterpart UE at step 1020, at step 1030, the UE determines the intensity of transmission power of a PSSCH and/or PSCCH based on the obtained system information. The intensity of transmission power of the PSSCH and/or PSCCH may be determined using a method similar to the aforementioned method of determining the intensity of transmission power. The UE may check the intensity of transmission power of at least one channel used by a different UE based on system information obtained from the different UE, and may calculate a PL based on the RSRP of the channel whose intensity of transmission power has been checked. Thereafter, the UE may determine a proper intensity of transmission power of a PSSCH and/or PSCCH based on the calculated PL.

At step 1040, the SyncRX UE transmits a PSSCH and/or PSCCH based on the determined intensity of transmission power. The SyncRX UE may periodically obtain system information from a different UE and adjust the intensity of transmission power of the PSSCH and/or PSCCH. If it is discovered that another UE has been added to a group, the SyncRX UE may transmit a PSSCH and/or a PSCCH based on a predetermined intensity of transmission power.

If it is determined that the UE now performs one-to-one direct communication with the counterpart UE at step 1010 and that it cannot obtain system information from the counterpart UE at step 1020, at step 1050, the UE transmits a PSSCH and/or PSCCH based on a predetermined intensity of transmission power.

Figure 11:
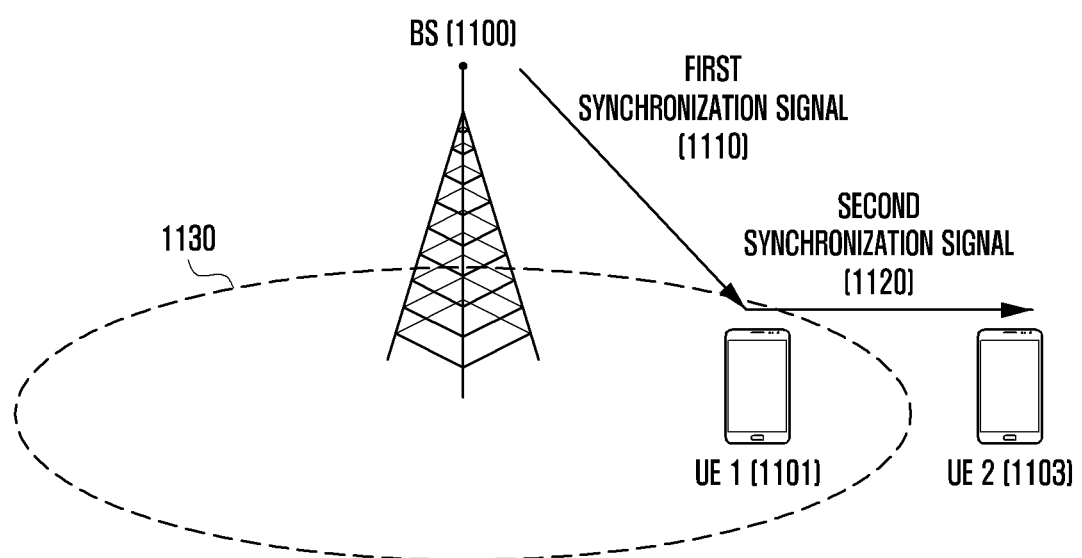
FIG. 11 is a diagram of a D2D wireless communication environment of partial coverage according to an embodiment.

FIG. 11 is a diagram of a D2D wireless communication environment of partial coverage according to an embodiment.

Referring to FIG. 11, a base station (BS) 1100) is present, and the BS 1100 may transmit a first synchronization signal 1110 in the downlink in order to provide a D2D synchronization reference with UEs belonging to the service area 1130 of the BS 1100. Assuming that a D2D UE UE1 1101 belonging to the service area of the BS 1100 is present, UE1 1101 may detect a PSS/SSS in the first synchronization signal 1110 and obtain synchronization. UE1 1101 may transmit a second synchronization signal 1120 necessary to enable D2D communication with another D2D UE out of the service area of the BS 1100 based on D2D synchronization reference timing provided by the BS 1100. In this case, whether UE1 1101 that transmits the second synchronization signal 1120 will operate as a SyncRef UE may be configured by the BS 1100. A synchronization identifier included in the transmitted second synchronization signal 1120 may also be configured by the BS 1100. If a UE is a UE in the idle state for which a configuration regarding whether the UE will operate as a SyncRef UE has not been performed by the BS 1100, the UE may measure the intensity of power received from the BS 1100 and transmit the second synchronization signal 1120 based on a threshold condition. If the intensity of power received from the BS 1100 is smaller than a predetermined threshold value, UE1 1101 may operate as a SyncRef UE and transmit the second synchronization signal 1120. A UE2 1103, (e.g., a D2D communication UE out of the service area of the BS 1100, may be synchronized with UE1 1101 based on the second synchronization signal 1120 received from UE1 1101. Thereafter, the two UE UE1 1101 and UE2 1103 may perform the transmission/reception of a PSSCH, PSCCH, and PSDCH based on the aforementioned D2D reference timing provided by the BS 1100.

Figure 12:
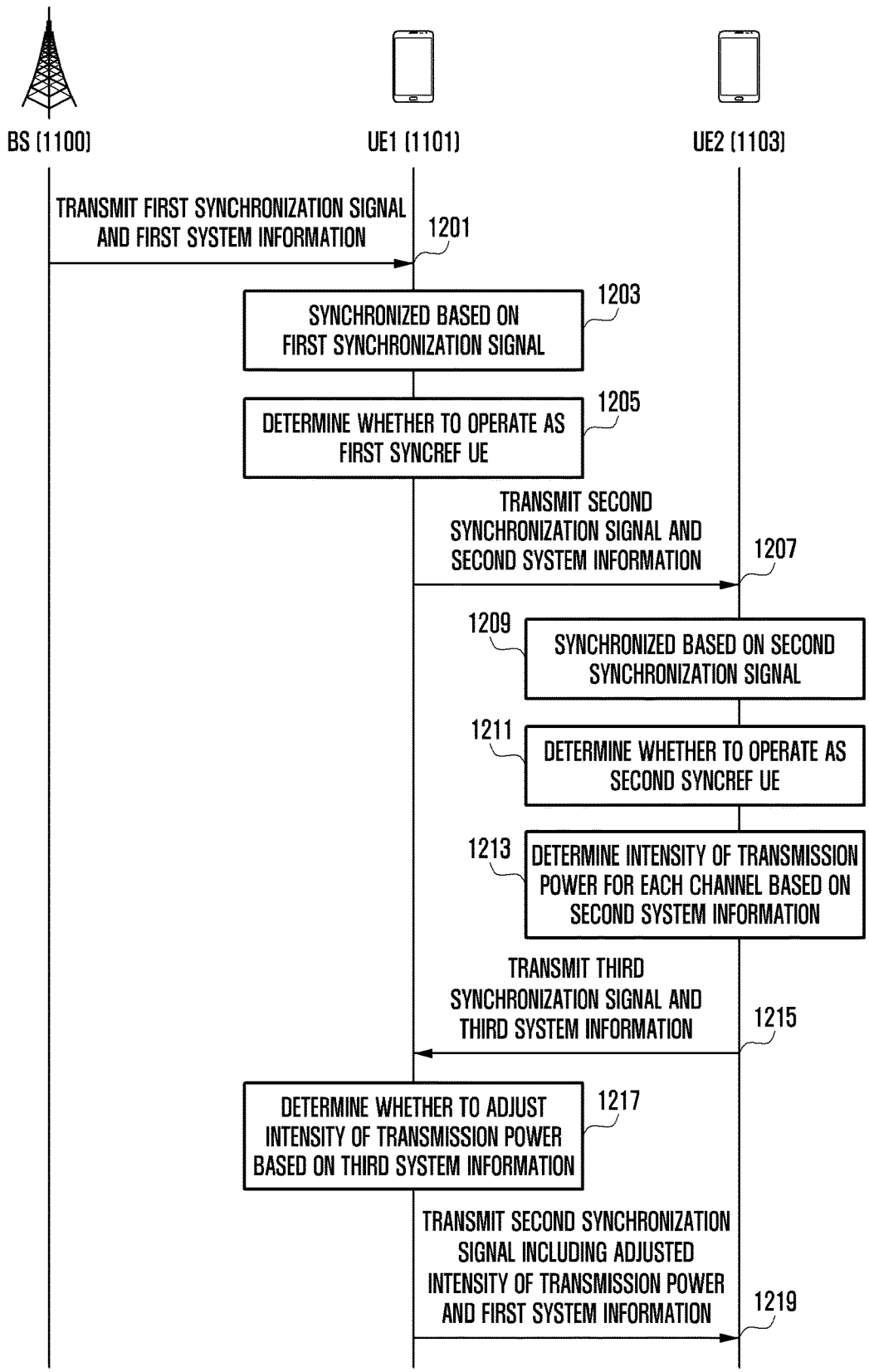
FIG. 12 is a flowchart of a D2D wireless communication synchronization method of partial coverage according to an embodiment.

FIG. 12 is a flowchart of a D2D wireless communication synchronization method of partial coverage according to an embodiment.

Referring to FIG. 12, at step 1201, a BS 1100 transmits a first synchronization signal and first system information in the downlink.

At step 1203, a UE1 1101 synchronizes with the BS 1100 based on the received first synchronization signal.

At step 1205, UE1 1101 determines whether to operate as a first SyncRef UE. Whether UE1 1101 will operate as the first SyncRef UE may be configured by the BS 1100. UE1 1101 may determine whether to operate as the first SyncRef UE based on the intensity of power received from the BS 1100 and a predetermined threshold condition. In this case, UE1 1001 may select at least one of values 0~167, meaning in-coverage, as a synchronization identifier based on the configuration of the BS 1000.

At step 1207, UE1 1101 that has operate as the first SyncRef UE transmits a second synchronization signal and second system information. The second synchronization signal may include a PSSS and an SSSS. The second system information may be transmitted through a channel for the transmission of essential information used for communication between UEs through a PSBCH. The second system information may be included in an MIB-SL. The second synchronization signal and the second system information may use 6 resource block frequency resources in the middle of a subframe for synchronization transmission/reception, which is present in a cycle of 40 ms in terms of time, based on the configuration of the BS 1100. The second system information may include the intensity of transmission power for at least one channel.

UE1 1101 may transmit (or broadcast) the second synchronization signal and the second system information based on the intensity of transmission power set by the BS 1100. UE1 1101 may receive system information, including the intensity of transmission power, from a D2D communication UE (e.g., a UE2 1103) out of the service area of the BS 1100, and may determine the second synchronization signal and the intensity of transmission power included in the second system information. In such a case, UE1 1101 may transmit (or broadcast) the second synchronization signal and the second system information based on a smaller one of the intensity of transmission power set by the BS 1100 and the intensity of transmission power determined based on a D2D communication UE out of the service area.

At step 1209, UE2 1103 receives the second synchronization signal and the second system information from UE1 1101, and may be synchronized with UE1 1101 based on the second synchronization signal. UE2 1103 may be synchronized with UE1 1101 by detecting a PSSS/SSSS from the second synchronization signal.

At step 1211, UE2 1103 determines whether to operate as a second SyncRef UE. If UE2 1103 is located at the edge of coverage of UE1 1101, the RSRP of the second synchronization signal received from UE1 1101 may become a predetermined threshold or less, and thus UE2 1103 may operate as the second SyncRef UE based on a threshold condition.

At step 1213, UE2 1103 determines the intensity of transmission power of each channel based on the second system information received from UE1 1101. UE2 1103 may determine the intensity of transmission power of at least one channel of a PSSS, an SSSS, a PSSCH, a PSCSH, and a PSDCH to be used as the second SyncRef UE based on the second system information received from UE1 1101. UE2 1103 may calculate a PL based on the RSRP of the system information received from UE1 1101, and may determine the intensity of transmission power of each channel by taking into consideration the distance from UE1 1101 or the intensity of transmission power of UE1 1101.

At step 1215, UE2 1103 transmits a third synchronization signal and third system information based on the determined intensity of transmission power of each channel. The third synchronization signal may be based on the synchronization signal configured by the BS 1100. The third system information may be transmitted through a PSBCH. The third system information may include the intensity of transmission power that belongs to pieces of the determined transmission power of the channels and that is related to at least one channel.

At step 1217, UE1 1101 receives the third synchronization signal and the third system information from UE2 1103, and may determine whether to adjust the intensity of power that is being transmitted based on the third system information. UE1 1101 may determine whether to adjust the intensity of transmission power of at least one channel of a PSSS, an SSSS, a PSSCH, a PSCSH, and a PSDCH based on the third system information received from UE2 1103.

At step 1219, UE1 1101 adjusts the intensity of transmission power based on a result of the determination and retransmit the second synchronization signal and the second system information.

When UEs perform D2D communication out of coverage or a UE in coverage and a UE out of coverage perform D2D communication, current consumption can be reduced by calculating a PL between UEs and effectively controlling transmission power of a UE.

The occurrence of interference between UEs belonging to different groups can be reduced by effectively controlling transmission power of a UE.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A user equipment (UE) supporting device-to-device (D2D) wireless communication, the UE comprising:
   a communication module configured to communicate with at least one different UE;
   a non-transitory computer readable memory storage configured to store instructions; and
   at least one processor electrically connected to the communication module and the memory storage,
   wherein the instructions, when executed by the UE, cause the processor to:
   check whether an available first synchronization signal is detected,
   determine whether to operate as a first synchronization reference UE based on whether the first synchronization signal is detected,
   transmit first system information comprising an intensity of transmission power and a second synchronization signal comprising a first synchronization identifier if the UE is determined to operate as the first synchronization reference UE,
   discover a second synchronization reference UE,
   receive a third synchronization signal from the second synchronization reference UE,
   compare a second synchronization identifier included in the received third synchronization signal with the first synchronization identifier,
   receive second system information from the second synchronization reference UE, if the second synchronization identifier and the first synchronization identifier have an identical value,
   determine whether to adjust the intensity of transmitting transmission power of at least one D2D wireless communication channel based on the received second system information, and
   adjust the intensity of transmission power based on the determination and transmit the adjusted transmission power.

2. The UE of claim 1, wherein the first system information is included in a D2D master information block "MasterinformationBlock-SL."

3. The UE of claim 2, wherein the first synchronization identifier comprises information indicative of an out-of-coverage state.

4. The UE of claim 1, wherein the instructions further cause the processor to transmit the second synchronization signal with maximum power intensity, if the second synchronization identifier and the first synchronization identifier have different values.

5. The UE of claim 1, wherein when at least two second synchronization identifiers having the same value as the first synchronization identifier are discovered, the instructions further cause the processor to:
   check a path loss (PL) of each of the discovered at least two second synchronization reference UEs, and
   determine whether to adjust the intensity of transmission power based on a second synchronization reference UE having a maximum PL.

6. A user equipment (UE) supporting device to device (D2D) wireless communication, the UE comprising:
   a communication module configured to communicate with at least one different UE;
   a non-transitory computer readable memory storage configured to store instructions; and
   at least one processor electrically connected to the communication module and the memory storage,
   wherein the instructions, when executed by the UE, cause the processor to:
   receive a first synchronization signal and first system information from a first synchronization reference UE,
   synchronize with the first synchronization reference UE based on the received first synchronization signal and determine whether to operate as a second synchronization reference UE based on an intensity of the first synchronization signal,
   determine the intensity of transmission power of at least one D2D wireless communication channel to be used by the second synchronization reference UE based on the received first system information,
   transmit a second synchronization signal and second system information based on the determined intensity of transmission power,
   check an intensity of transmission power of at least one channel used by the first synchronization reference UE based on the received first system information,
   check a reference signal received power (RSRP) of at least one channel corresponding to the at least one channel used by the first synchronization reference UE, and calculate a path loss (PL) of the at least one channel based on a result of the check.

7. The UE of claim 6, wherein the instructions further cause the processor to:
check an RSRP of the first synchronization signal, and compare the RSRP with a predetermined threshold.

8. The UE of claim 6, wherein the instructions further cause the processor to calculate an intensity of transmission power for communication with the first synchronization reference UE based on the calculated PL for the at least one channel.

9. A method of controlling power of a device to device (D2D) wireless communication user equipment (UE), the method comprising:
checking, by the UE, whether an available first synchronization signal is detected;
determining, by the UE, whether to operate as a first synchronization reference UE based on whether the first synchronization signal is detected,
transmitting, by the UE, first system information comprising an intensity of transmission power and a second synchronization signal comprising a first synchronization identifier if the UE is determined to operate as the first synchronization reference UE,
discovering a second synchronization reference UE;
receiving a third synchronization signal from the second synchronization reference UE;
comparing a second synchronization identifier included in the received third synchronization signal with the first synchronization identifier;
receiving second system information from the second synchronization reference UE if the second synchronization identifier and the first synchronization identifier have an identical value;
determining whether to adjust the intensity of transmitting transmission power of at least one D2D wireless communication channel based on the received second system information; and
adjusting the intensity of transmission power based on the determination and transmitting the adjusted transmission power.

10. The method of claim 9, wherein the first system information is included in a D2D master information block "MasterinformationBlock-SL."

11. The method of claim 10, wherein the first synchronization identifier comprises information indicative of an out-of-coverage state.

12. The method of claim 9, further comprising:
transmitting the second synchronization signal with maximum power intensity, if the second synchronization identifier and the first synchronization identifier have different values.

13. The method of claim 9, further comprising:
checking a path loss (PL) of the discovered second synchronization reference UE when at least two second synchronization identifiers having the same value as the first synchronization identifier are discovered; and
determining whether to adjust the intensity of transmission power based on a second synchronization reference UE having a maximum PL.

14. A method of controlling power of a device to device (D2D) wireless communication user equipment (UE), the method comprising:
receiving a first synchronization signal and first system information from a first synchronization reference UE;
synchronizing with the first synchronization reference UE based on the received first synchronization signal;
determining whether to operate as a second synchronization reference UE based on an intensity of the first synchronization signal;
determining the intensity of transmission power of at least one D2D wireless communication channel to be used by the second synchronization reference UE based on the received first system information;
transmitting a second synchronization signal and second system information based on the determined intensity of transmission power
checking an intensity of transmission power of at least one channel used by the first synchronization reference UE based on the received first system information;
checking a reference signal received power (RSRP) of at least one channel corresponding to the at least one channel used by the first synchronization reference UE; and
calculating a path loss (PL) of the at least one channel based on a result of the check.

15. The method of claim 14, wherein the operation of determining whether to operate as the second synchronization reference UE further comprises:
checking an RSRP of the first synchronization signal; and comparing the RSRP with a predetermined threshold.

16. The method of claim 14, further comprising calculating an intensity of transmission power for communication with the first synchronization reference UE based on the calculated PL for the at least one channel.

* * * * *